United States Patent
Murray et al.

(10) Patent No.: US 9,769,762 B1
(45) Date of Patent: Sep. 19, 2017

(54) ADAPTIVE TRANSMIT POWER CONTROL FOR VEHICLE COMMUNICATION

(71) Applicant: Ford Global Technologies, LLC, Dearborn, MI (US)

(72) Inventors: Allen R. Murray, Lake Orion, MI (US); Oliver Lei, Windsor (CA)

(73) Assignee: FORD GLOBAL TECHNOLOGIES, INC., Dearborn, MI (US)

( * ) Notice: Subject to any disclaimer, the term of this patent is extended or adjusted under 35 U.S.C. 154(b) by 0 days.

(21) Appl. No.: 15/261,458

(22) Filed: Sep. 9, 2016

(51) Int. Cl.
*H04W 52/18* (2009.01)
*H04L 29/08* (2006.01)

(52) U.S. Cl.
CPC ............. *H04W 52/18* (2013.01); *H04L 67/12* (2013.01)

(58) Field of Classification Search
CPC ........ G01S 13/931; G01S 7/022; G01S 13/86; G01S 13/867; G01S 13/92; G01S 2013/936
USPC .......... 455/522, 69, 68, 445, 301, 3.06, 345, 455/414.1–414.4, 404.1, 404.2, 521, 455/426.1, 426.2, 422.1, 403; 342/19, 342/104, 107, 461; 701/96, 119; 340/466, 902
See application file for complete search history.

(56) References Cited

U.S. PATENT DOCUMENTS

| | | | |
|---|---|---|---|
| 7,355,525 | B2 | 4/2008 | Tengler et al. |
| 8,265,624 | B2 | 9/2012 | Guener et al. |
| 8,682,379 | B2 | 3/2014 | Hsieh et al. |
| 9,084,190 | B2 | 7/2015 | Noh et al. |
| 2004/0002346 | A1* | 1/2004 | Santhoff ............... G01S 5/0045 455/456.1 |
| 2008/0055068 | A1 | 3/2008 | Van Wageningen et al. |
| 2012/0136559 | A1* | 5/2012 | Rothschild ........... G08G 1/0965 701/117 |
| 2014/0045556 | A1* | 2/2014 | Subramanian .... H04W 52/0251 455/574 |
| 2016/0112962 | A1 | 4/2016 | Park |

FOREIGN PATENT DOCUMENTS

EP 2276012 B1 8/2014

OTHER PUBLICATIONS

Core System Requirements Specification (SyRS), www.its.dot.gov/index.htm Revision A—Jun. 13, 2011 (pp. 1-131).

* cited by examiner

*Primary Examiner* — Keith Ferguson
(74) *Attorney, Agent, or Firm* — James P. Muraff; Neal, Gerber & Eisenberg LLP

(57) ABSTRACT

Apparatus and methods are disclosed for adaptive transmit power control for vehicle communication. An example disclosed vehicle includes a driving assistance unit and a communication module. The driving assistance unit determines an expected speed of target vehicles in the vicinity of the vehicle. The communication module determines a message type of a message received from a subsystem of the vehicle. Additionally, the communication module broadcasts the message at a power level. The power level is based on the message type and the expected speed of target vehicles.

13 Claims, 7 Drawing Sheets

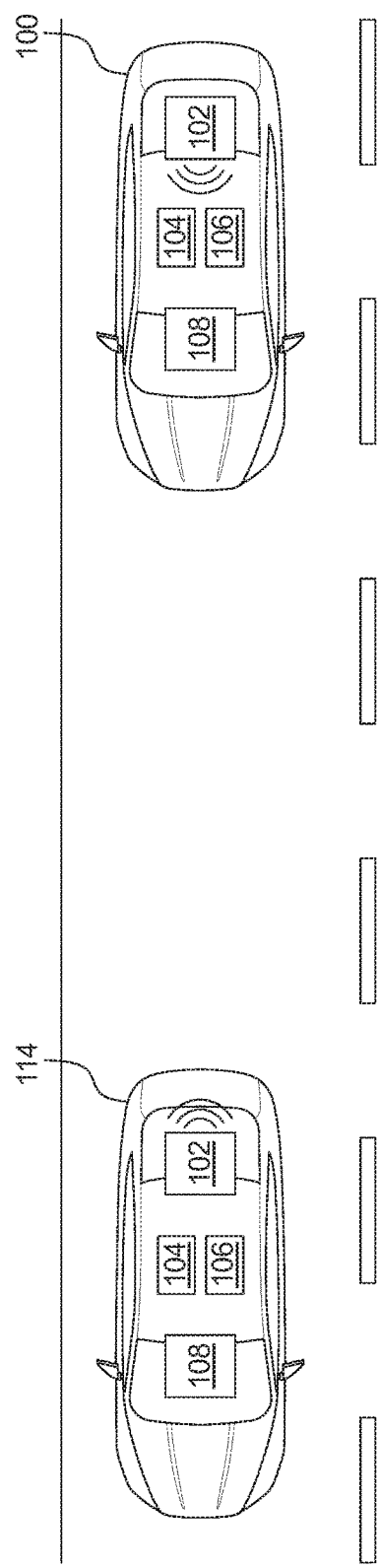

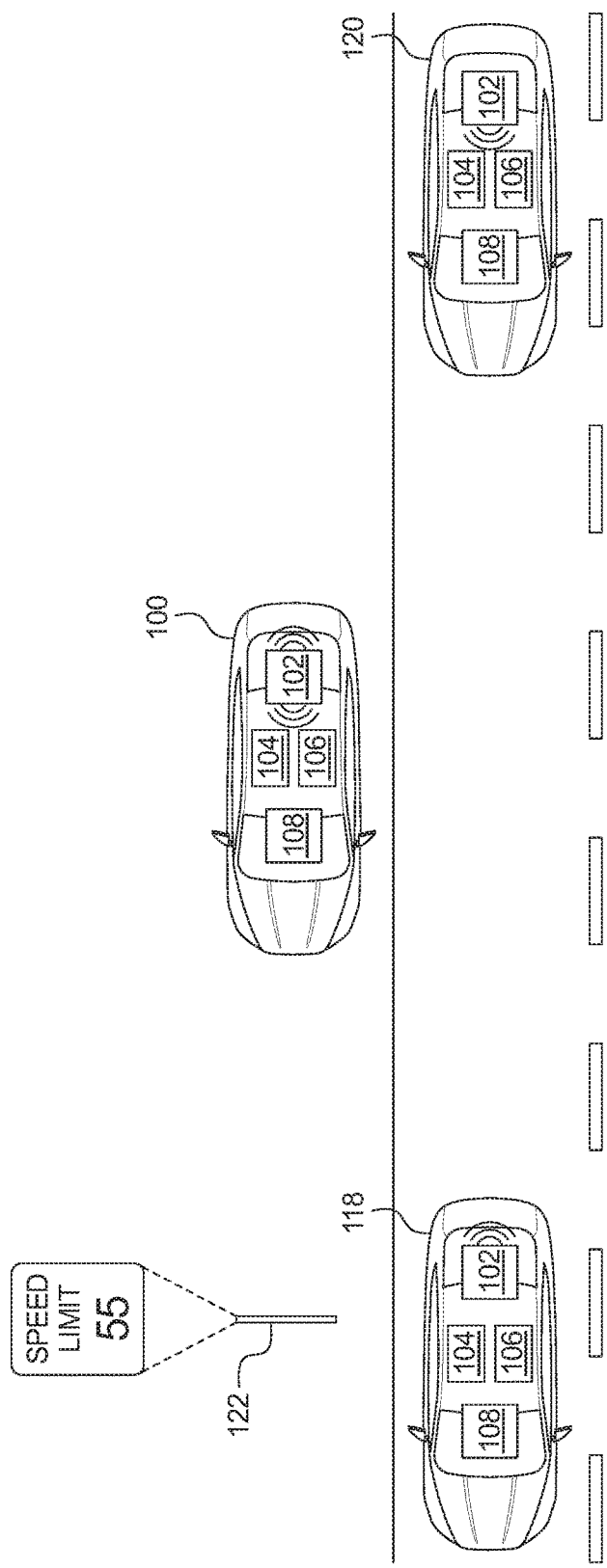

ADAPTIVE TRANSMIT POWER CONTROL FOR VEHICLE COMMUNICATION

TECHNICAL FIELD

The present disclosure generally relates to vehicle-to-everything (V2X) communication and, more specifically, adaptive transmit power control for vehicle communication.

BACKGROUND

In the United States, the Dedicated Short Range Communication (DSRC) network is a vehicle-to-everything (V2X) communication network being deployed as a part of the Intelligent Transportation System. DSRC facilitates vehicles communicating with other vehicles to coordinate driving maneuvers and provide warnings about potential road hazards. Additionally, DSRC facilitates communicating with infrastructure-based nodes, such as toll booths and traffic signals. The aim of deploying the DSRC protocol is to reduce fatalities, injuries, property destruction, time lost in traffic, fuel consumption, exhaust gas exposure, among others.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for adaptive transmit power control for vehicle communication. An example disclosed vehicle includes a driving assistance unit and a communication module. The driving assistance unit determines an expected speed of target vehicles in the vicinity of the vehicle. The communication module determines a message type of a message received from a subsystem of the vehicle. Additionally, the communication module broadcasts the message at a power level. The power level is based on the message type and the expected speed of target vehicles.

An example disclosed method includes determining, via a driving assistance unit, an expected speed of target vehicles in the vicinity of the vehicle. The example method also includes determining a message type of a message received from a subsystem of the vehicle. Additionally, the method includes broadcasting, with a communication module, the message at a power level. The power level is based on the message type and the expected speed of the target vehicles.

An example tangible computer readable medium comprising instructions that, when executed, cause a vehicle to determine, via a driving assistance unit, an expected speed of target vehicles in the vicinity of the vehicle. The instructions also cause the vehicle to determine a type of a message received from a subsystem of the vehicle. Additionally, the instructions cause the vehicle to broadcast, with a communication module, the message at a power level. The power level is based on the message type and the expected speed of the target vehicles.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIGS. 1A-1D illustrate vehicles with vehicle-to-everything (V2X) modules operating in accordance with the teachings of this disclosure.

DETAILED DESCRIPTION OF EXAMPLE EMBODIMENTS

Figure 1A:
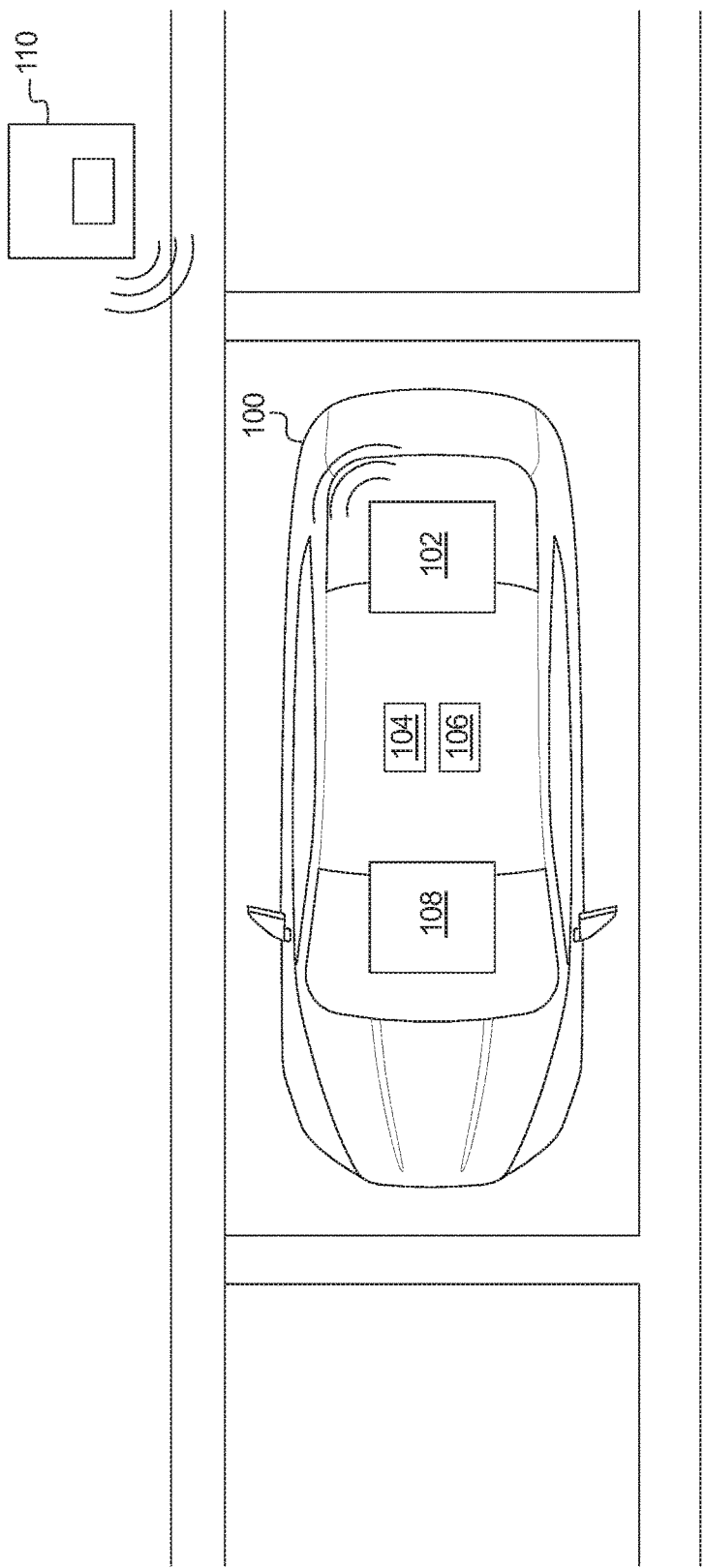

While the invention may be embodied in various forms, the drawings will show and hereinafter describe some exemplary and non-limiting embodiments, with the understanding that the present disclosure is to be considered an exemplification of the invention and is not intended to limit the invention to the specific embodiments illustrated.

Vehicle-to-everything (V2X) communication includes vehicle-to-vehicle (V2V) communication, vehicle-to-infrastructure (V2I) communication, and vehicle-to-pedestrian (V2P) communication. V2X communication facilitates interaction and coordination between vehicles (e.g., cars, trucks, motorcycles, trains, boats, etc.) and other objects and users of the roadways. A specific implementation of V2X communication is Dedicated Short Range Communication (DSRC). With many vehicles on the road, the radio signal transmitted by all the vehicles may cause radio interference which then impacts the signal quality to every vehicle. Even with dividing an allotted spectrum (e.g., 5.9 GHz) into different channels and employing channel hopping techniques, as V2X communication is increasingly adopted, the potential for disruptive radio interference increases as messages transmitted on the same channel reduce the ambient signal-to-noise ratio on that channel. As disclosed below, tailoring power used to broadcast a message facilitates the intended target vehicle receiving the message while reducing a number of unintended vehicles who also receive the message on that particular channel.

Applications that communicate via V2X communication are categorized as public safety and private services. Public safety applications facilitate vehicles exchanging operation data (e.g., speed, position, trajectory, lane, etc.) and hazard data so that vehicles can coordinate driving and avoid hazards. For example, public safety applications may include blind spot detection, forward collision detection, sudden braking detection, emergency vehicle warnings, commercial vehicle clearance, and commercial vehicle safety inspections, etc. Example public safety messages include Signal Phase and Timing (SPaT) messages that inform vehicles of timing of traffic signals at intersections. Private service applications facilitate non-safety related communication. For example, private service applications may include electronic parking and toll payments, and vehicle-to-vehicle (V2V) social messaging, rental car processing, fleet management, dam camera video data transfers, etc. The range of a V2X broadcast is related to the transmitter power of the V2X module. More transmitter power causes the broadcast signal to travel farther.

As disclosed below, the transmitter power of the V2X module is determined by (a) an expected speed of the target vehicle(s), (b) a speed difference between the transmitting vehicle and the expected speed of the target vehicle, and/or (c) a type of message. As used herein, the expected speed is a speed that the transmitting vehicle determines likely in the area around the transmitting vehicle. For example, the expected speed may be the speed limit. The transmitting vehicle determines the expected speed from, for example, an advanced driver assistance system (ADAS). The advanced driver assistance system performs character recognition to determine the speed limit from speed limit signs. In some examples, the transmitting vehicle determines the expected speed from a navigation application executing on an infotainment system. For example, on an interstate the expected speed may be 70 miles per hour (mph). As another example, the transmitting vehicle could make a hard brake and slow down quickly, and other nearby vehicles may be traveling at the highway speed. In such an example, if the speed of the transmitting vehicle is 20 mph and the expected speed of traffic is 70 mph, the transmitting power of the V2X module may be based on the 50 mph speed difference.

An application may specify a message type (e.g., public, private, short, medium, long, etc.). In some examples, the transmission power (sometimes referred to as "effective isotropic radiated power (EIRP)") of the V2X module is determined by the message type. For example, a private short message may be transmitted with a first power level, and a public long message may be transmitted with a second power level. In some such examples, the transmission power is adjusted based on the difference between the speed of the transmitting vehicle and the expected speed of the target vehicle. For example, a private medium message may be transmitted at a third power level instead of a second power level because the speed difference is 21 mph.

FIGS. 1A-1D illustrate vehicles 100 with vehicle-to-everything (V2X) modules 102 operating in accordance with the teachings of this disclosure. The vehicle 100 (e.g., a car, a truck, a motorcycle, a train, a boat, etc.) may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example the vehicle 100 includes the V2X module 102, an infotainment head unit 104, and an advanced driver assistance system (ADAS) unit 106.

The V2X module 102 includes radio(s) and software to broadcast messages and to establish direct connections between the vehicle 100, other vehicles, infrastructure-based modules (not shown), and mobile device-based modules (not shown). More information on the DSRC network and how the network may communicate with vehicle hardware and software is available in the U.S. Department of Transportation's Core June 2011 System Requirements Specification (SyRS) report (available at http://www.its.dot.gov/meetings/pdf/CoreSystem_SE_SyRS_RevA%20(2011-06-13).pdf), which is hereby incorporated by reference in its entirety along with all of the documents referenced on pages 11 to 14 of the SyRS report. V2X systems may be installed on vehicles and along roadsides on infrastructure. V2X systems incorporating infrastructure information is known as a "roadside" system. V2X may be combined with other technologies, such as Global Position System (GPS), Visual Light Communications (VLC), Cellular Communications, and short range radar, facilitating the vehicles communicating their position, speed, heading, relative position to other objects and to exchange information with other vehicles or external computer systems. V2X systems can be integrated with other systems such as mobile phones.

Currently, the V2X network is identified under the DSRC abbreviation or name. However, other names are sometimes used, usually related to a Connected Vehicle program or the like. Most of these systems are either pure DSRC or a variation of the IEEE 802.11 wireless standard. However, besides the pure DSRC system it is also meant to cover dedicated wireless communication systems between cars and roadside infrastructure system, which are integrated with GPS and are based on an IEEE 802.11 protocol for wireless local area networks (such as, 802.11p, etc.).

The V2X module 102 controls the transmission power of signals sent from the antenna of the V2X module 102. In some examples, the V2X module 102 controls the effective isotropic radiated power (EIRP) of the signals between 0 to 20 dBm (e.g., 1 to 100 milliWatts (mW)). For example, for signals to have a range of 1000 meters (3281 feet), the V2X module 102 may transmit with a signal strength of 20 dBm. As another example, for signal to have a range of 300 meters (984 feet), the V2X module 102 may transmit with a signal strength of 12 dBm. The V2X module 102 defines power levels that correspond to target ranges. For example, the signal strength of 20 dBm may be defined as a fourth power level and the signal strength of 12 dBm may be defined as a third power level.

Figure 2A:
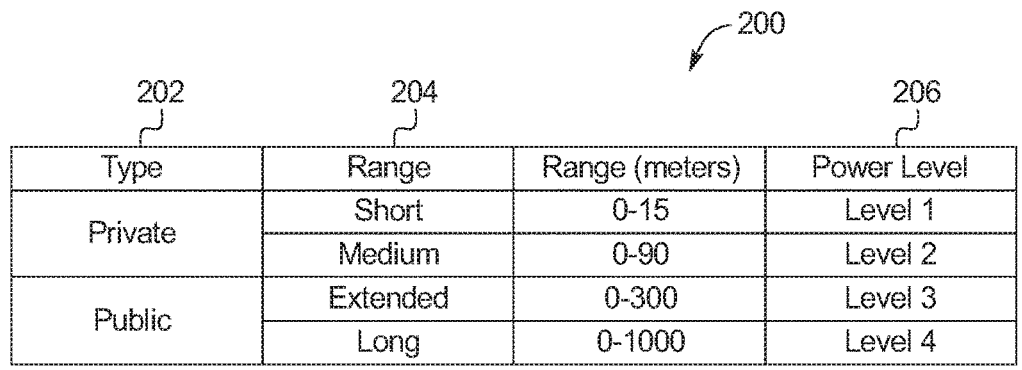
FIGS. 2A-2C depict example tables used to determine a power level for the V2X module.
Figure 2B:
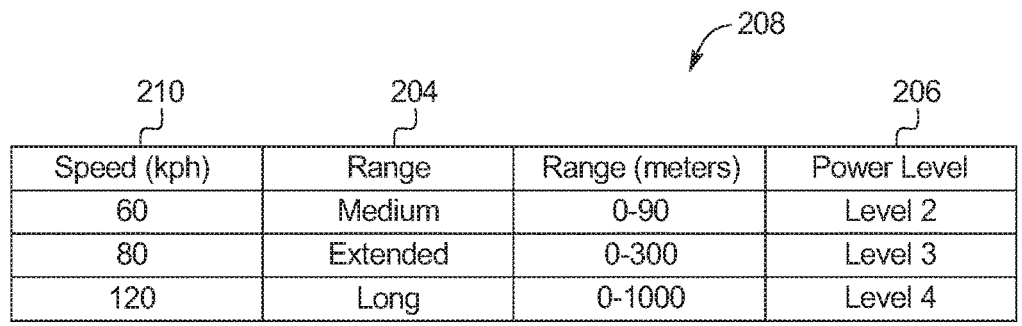
Figure 2C:
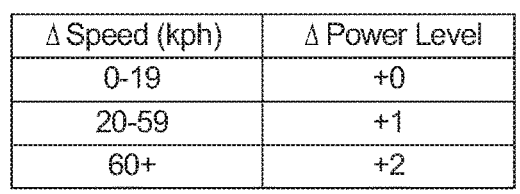

The V2X module 102 receives the expected speed for target vehicles in the area and the current speed of the vehicle 100 from the ADAS unit 106. In some examples, the V2X module 102 does not receive an actual speed (e.g., as measured by range detection sensors) of any of the target vehicles from the ADAS unit 106. Additionally, the V2X module 102 receives a message type and/or a requested range from applications that communicate via the V2X module 102. Based on the expected speed, the currently speed of the vehicle 100, the message type, and/or the requested range, the V2X module 102 determines a power level at which to transmit the message. FIG. 2A illustrates a table 200 that associates the message type 202 and a requested range 204 with a power level 206. For example, a private service message with a requested short range may be broadcast at a first power level. For example, the first power level may be −8 dBm. FIG. 2B illustrates a table 208 that associates the expected speed 210 of the target vehicle with the power level 206. For example, if the expected speed of the target vehicle is 70 mph (113 kph), the V2X module 102 may broadcast the message at a third power level (e.g., 12 dBm). FIG. 2C is a table 212 that associates the difference between the speed of the vehicle 100 and the expected speed of the target vehicle (Δ Speed) with a broadcast power adjustment (Δ Power Level). For example, if an application requests a medium range private service message and the Δ Speed is 16 mph (26 kph), the V2X module 102 may broadcast the message at the third power level instead of the second power level. In some examples, the V2X module 102 adjusts the power level based on the speed difference satisfying (e.g., being greater than or equal to) one or more speed thresholds.

Additionally, in some examples, the V2X module 102 distinguishes between public safety and private service messages. In such examples, the V2X module 102 (a) restricts ranges that may be requested for private service messages, and (b) does not adjust the power level for private service messages. For example, the V2X module 102 may restrict private service messages to a short range (e.g., 0 to 15 meters) and a medium range (e.g., 0 to 90 meters). If, for example, a medium range private service message is requested and the speed difference between the speed of the vehicle 100 and the expected speed of the target is 16 mph, the V2X module 102 broadcasts the message at the second power level that corresponds to the medium range.

The infotainment head unit 104 provides an interface between the vehicle 100 and a user. The infotainment head unit 104 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In the illustrated example, the infotainment head unit 104 includes hardware (e.g., a processor or controller, memory, storage, etc.) and software (e.g., an operating system, etc.) for an infotainment system 108 (such as SYNC® and MyFord Touch® by Ford®, Entune® by Toyota®, IntelliLink® by GMC®, etc.).

Additionally, the infotainment head unit 104 displays the infotainment system 108 on, for example, the center console display. The infotainment system 108 executes applications, such as navigation applications, communication applications, entertainment applications, etc. that may use the V2X module 102 to communicate. Such applications request that the V2X module 102 broadcast messages. In some examples, the requests from the applications include a type (e.g., public safety or private service) and/or a range. For examples, a payment application may request that the V2X module 102 broadcast a short range message.

The ADAS unit 106 facilitates situational awareness around the vehicle 100. The ADAS unit 106 may include or may be incorporated into vehicle systems that provide guidance and assistance to drivers, such as blind spot detection and rear collision warning, etc. The ADAS unit 106 uses sensors (e.g., the sensors 304 of FIG. 3 below) to detect and identify objects (e.g. vehicles, pedestrian, traffic signs, etc.) around the vehicle 100. In the illustrated examples, the ADAS unit 106 detects speed limit signs. Additionally, the ADAS unit 106 performs optical character recognition to determine the speed limit from the speed limit signs. In some examples, the ADAS unit 106 requests that a message be broadcast by the V2X module 102. For example, when the ADAS unit 106 includes rear collision detection, the ADAS unit 106 may request a private medium range message be broadcast.

FIGS. 1A and 1B illustrate examples of the vehicle 100 broadcasting private service messages. In the example illustrated in FIG. 1A, the vehicle 100 is parked near a parking payment box 110. The parking payment box 110 includes an infrastructure-based V2X node 112. The infrastructure-based V2X node 112 sends and receives messages from V2X modules 102 of the vehicles 100. For example, a payment application instantiated by the infotainment system 108 instruct may instruct the V2X module 102 of the vehicle 100 to broadcast a private, short range message to initiate payment with the parking payment box 110. In the example illustrated in FIG. 1B, the vehicle 100 transmits a message to a target vehicle 114. The vehicle 100 instructs the V2X module 102 to transmit a private, medium range message. Because the message is a private service message, the V2X module 102 does not consider the speed of the vehicle 100 or the expected speed of the target vehicle 114.

Figure 1D:
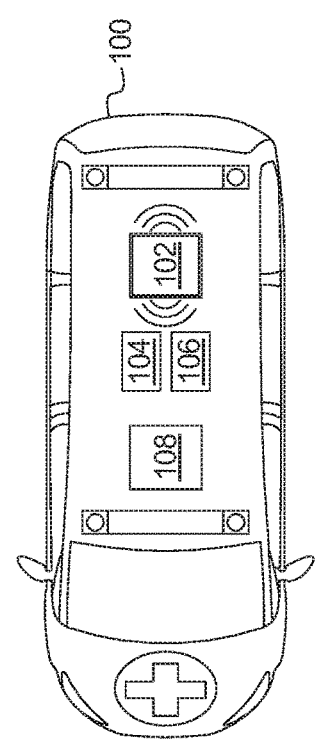

FIGS. 1C and 1D illustrate examples of the vehicle 100 broadcasting public safety messages. In the example illustrated in FIG. 1C, the vehicle 100 is parked on the side of the road. The vehicle 100 instructs its V2X module 102 to broadcast a public safety message to inform other (e.g., the vehicles 118 and 120) that it is experiencing an emergency. The V2X module 102 determines the expected speed of the vehicles 118 and 120 via the ADAS unit 106. The ADAS unit 106 determines the expected speed by performing optical character recognition on the speed limit sign 122. Because the expected speed of traffic is 55 mph (89 kph), the V2X module 102 broadcasts the message using a third power level (e.g., an extended range). In the example illustrated in FIG. 1D, the vehicle 100 is an emergency vehicle. The vehicle 100 instructs the V2X module 102 to broadcast a public safety message at a long range.

Figure 3:
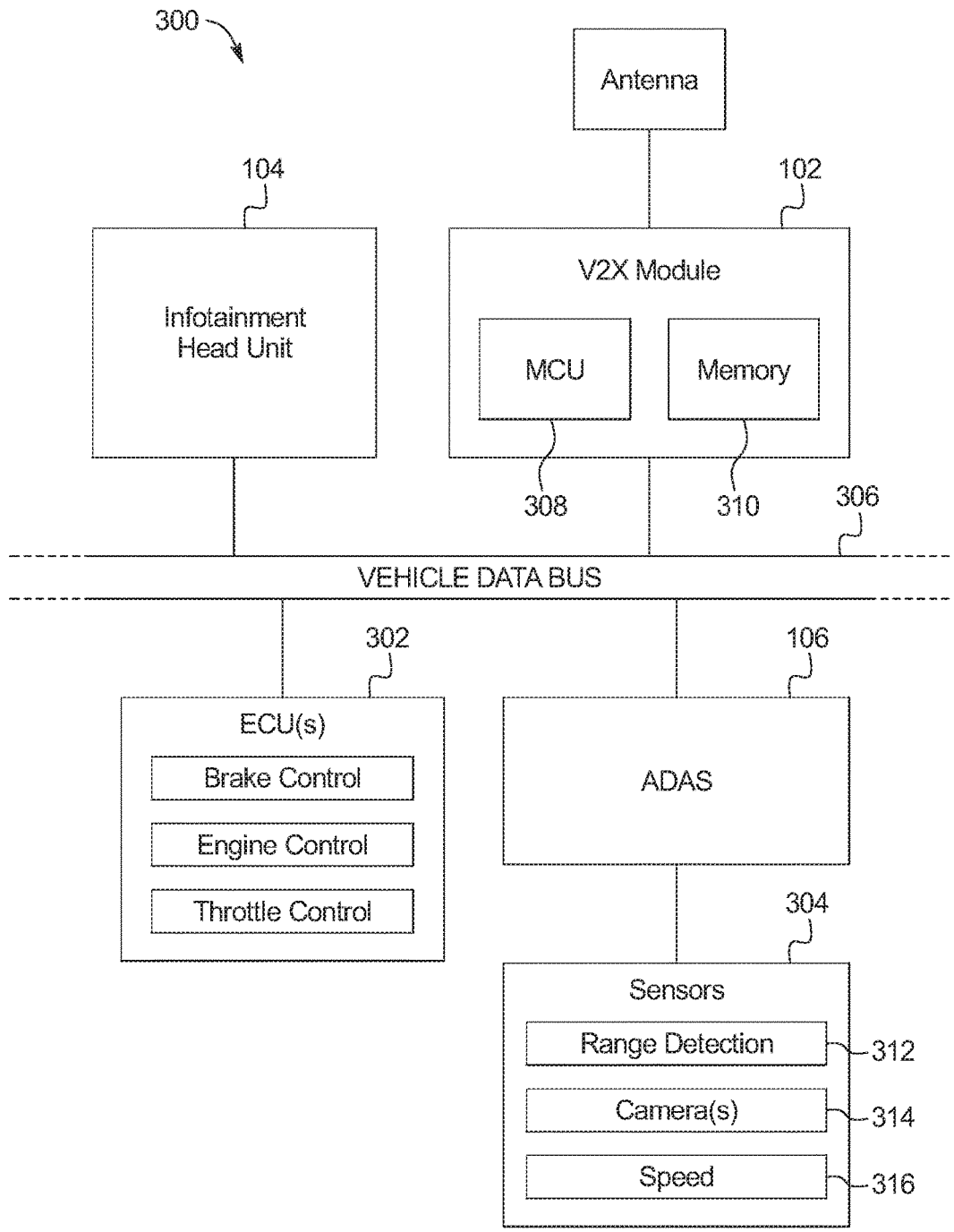
FIG. 3 is a block diagram of electronic components of the vehicles of FIGS. 1A-1D.

FIG. 3 is a block diagram of electronic components 300 of the vehicles 100 of FIGS. 1A-1D. In the illustrated example, the electronic components include the V2X module 102, the infotainment head unit 104, the ADAS unit 106, electronic control units (ECUs) 302, sensors 304, and a vehicle data bus 306.

In the illustrated example, the V2X module 102 includes a processor or controller 308, and memory 310. The processor or controller 308 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 310 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 310 includes multiple kinds of memory, particularly volatile memory and non-volatile memory.

The memory 310 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 310, the computer readable medium, and/or within the processor 308 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The ECUs 302 monitor and control the subsystems of the vehicle 100. The ECUs 302 communicate and exchange information via a vehicle data bus (e.g., the vehicle data bus 306). Additionally, the ECUs 302 may communicate properties (such as, status of the ECU 302, sensor readings, control state, error and diagnostic codes, etc.) to and/or receive requests from other ECUs 302. Some vehicles 100 may have seventy or more ECUs 302 located in various locations around the vehicle 100 communicatively coupled by the vehicle data bus 306. The ECUs 302 are discrete sets of electronics that include their own circuit(s) (such as integrated circuits, microprocessors, memory, storage, etc.) and firmware, sensors, actuators, and/or mounting hardware. In the illustrated example, the ECUs 302 include a brake control unit, an engine control unit, and a throttle control unit. For example, the ADAS unit 106 may receive a message from the brake control unit indicative of sudden application of the brakes of the vehicle 100. In such an example, the ADAS unit 106 may instruct the V2X module 102 to broadcast a public safety message informing other vehicles of the sudden deceleration.

The sensors 304 may be arranged in and around the vehicle 100 in any suitable fashion. The sensors 304 may measure properties around the exterior of the vehicle 100. Additionally, some sensors 304 may be mounted inside the cabin of the vehicle 100 or in the body of the vehicle 100 (such as, the engine compartment, the wheel wells, etc.) to measure properties in the interior of the vehicle 100. For example, such sensors 304 may include accelerometers, odometers, tachometers, pitch and yaw sensors, wheel speed sensors, microphones, tire pressure sensors, and biometric sensors, etc. In the illustrated example, the sensors 304 include range detection sensors 312 (e.g., ultrasonic sensors, RADAR, LiDAR, infrared sensors, etc.), camera(s) 314, and a speed sensor 316. The example sensors 304 are communicatively coupled to the ADAS unit 106 to facilitate the ADAS unit 106 detecting and recognizing objects around the vehicle 100.

The vehicle data bus 306 communicatively couples the V2X module 102, the infotainment head unit 104, the ADAS unit 106, and the ECUs 302. In some examples, the vehicle data bus 306 includes one or more data buses. The vehicle data bus 306 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7), a K-line bus protocol (ISO 9141 and ISO 14230-1), and/or an Ethernet™ bus protocol IEEE 802.3 (2002 onwards), etc.

Figure 4:
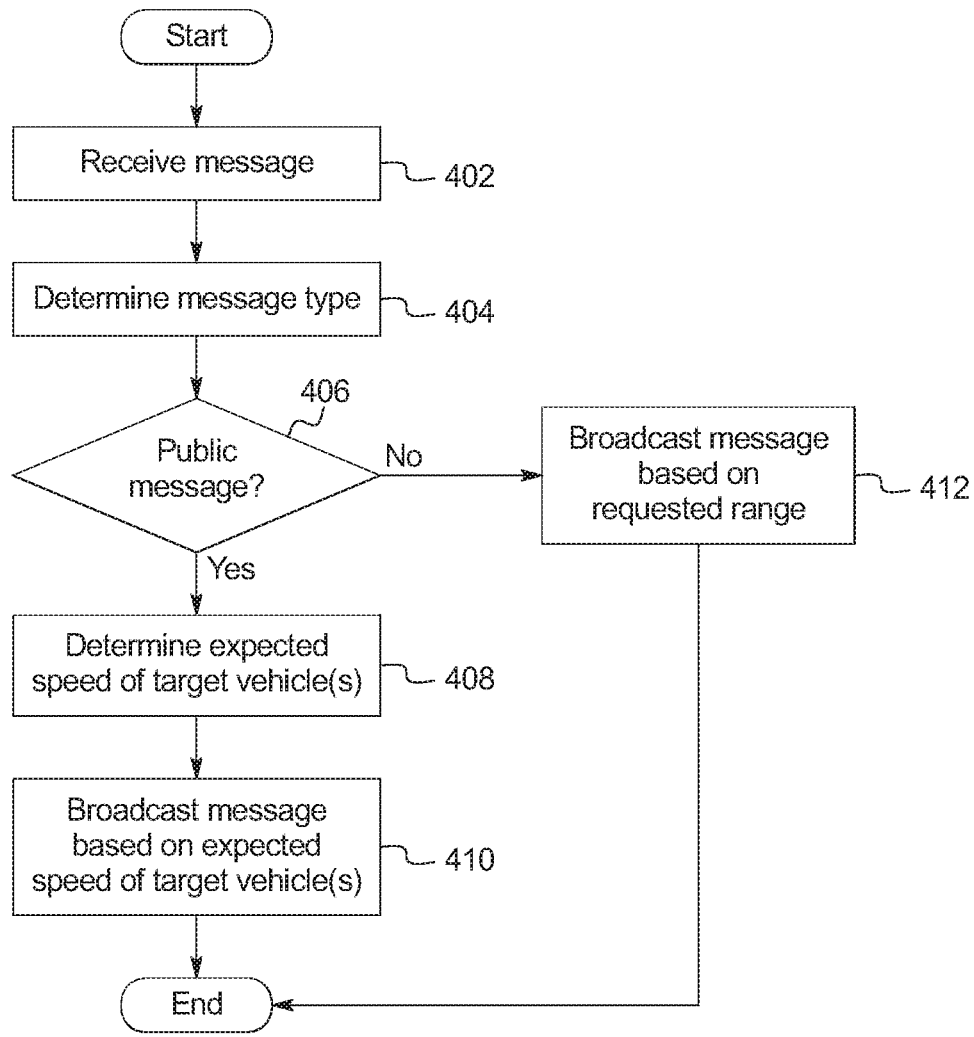
FIG. 4 is a flowchart of a method to determine the power level of for the V2X module that may be implemented by the electronic components of FIG. 3.

FIG. 4 is a flowchart of a method to determine the power level of for the V2X module 106 that may be implemented by the electronic components 300 of FIG. 3. Initially, at block 402, the V2X module 106 receives a message to be broadcast. For example, the message to be broadcast may originate from an application instantiated on the infotainment system 108, one of the ECUs 302, of the ADAS unit 106. At block 404, the V2X module 106 determines the type (e.g., public safety or private service) of the message received at block 402. At block 406, the V2X module 106 determines whether the message type is public safety. If the message type is public safety, the method continues at block 408. If the method is private service, the method continues at block 412.

At block 408, the V2X module 106 determines the expected speed of the target vehicle(s). In some examples, the V2X module 106 receives the expected speed from the ADAS unit 106. Alternatively or additionally, in some examples, the V2X module 106 receives the expected speed from a navigation program instantiated in the infotainment system 108. At block 410, the V2X module 106 broadcasts the message received at block 402 with a power level based on the expected speed of the target vehicle(s). At block 412, the V2X module 106 broadcasts the message received at block 402 with a power level based on the requested range.

The flowchart of FIG. 4 is representative of machine readable instructions that comprise one or more programs that, when executed by a processor (such as the processor 308 of FIG. 3), cause the vehicle 100 to implement the example V2X module 102 of FIGS. 1A, 1B, 1C, 1D, and 3. Further, although the example program(s) is/are described with reference to the flowchart illustrated in FIG. 4, many other methods of implementing the example V2X module 102 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
    a driving assistance unit to determine an expected speed of target vehicles in a vicinity of the vehicle; and
    a communication module to:
        determine a message type of a message received from a subsystem of the vehicle, the message type including public safety and private service; and
        broadcast the message at a power level, wherein when the message type is public safety, the power level is determined based on a range request accompanying the message, and wherein the power level is increased when a difference between the expected speed of the target vehicles and an actual speed of the vehicle satisfies a speed threshold.

2. The vehicle of claim 1, wherein when the message type is private service, the communication module is to broadcast the message with the power level determined based on a range request accompanying the message.

3. The vehicle of claim 1, wherein when the message type is public safety, the communication module is to broadcast the message with the power level determined based on the expected speed.

4. The vehicle of claim 1, wherein the driving assistance unit is to determine the expected speed without measuring an actual speed of the target vehicles.

5. A method comprising:
   determining, via a driving assistance unit, an expected speed of target vehicles in a vicinity of a vehicle;
   determining, with a processor, a message type of a message received from a subsystem of the vehicle, wherein the message type includes public safety and private service; and
   broadcasting, with a communication module, the message at a power level, wherein when the message type is public safety, the power level determined based on a range request accompanying the message, and the power level is increased when a difference between the expected speed of the target vehicles and an actual speed of the vehicle satisfies a speed threshold.

6. The method of claim 5, wherein when the message type is private service, broadcasting the message with the power level determined based on a range request accompanying the message.

7. The method of claim 5, wherein when the message type is public safety, broadcasting the message with the power level determined based on the expected speed.

8. The method of claim 5, including determining the expected speed without measuring an actual speed of the target vehicles.

9. A tangible computer readable medium comprising instructions that, when executed, cause a vehicle to:
   determine, via a driving assistance unit, an expected speed of target vehicles in a vicinity of the vehicle; and
   determine a type of a message received from a subsystem of the vehicle, the type including public safety and private service, and
   broadcast, with a communication module, the message at a power level, the power level based on the message type and the expected speed of the target vehicles, when the message type is public safety, the power level is determined based on a range request accompanying the message and the power level is increased when a difference between the expected speed of the target vehicle and an actual speed of the vehicle satisfies a speed threshold.

10. The computer readable medium of claim 9, wherein the instructions cause the vehicle to, when the message type is private service, broadcast the message with the power level determined based on a range request accompanying the message.

11. The computer readable medium of claim 9, wherein the instructions cause the vehicle to, when the message type is public safety, broadcast the message with the power level determined based on the expected speed.

12. The computer readable medium of claim 9, wherein the instructions cause the vehicle to determine the expected speed without measuring an actual speed of the target vehicles.

13. A method comprising:
    determining, via a driving assistance unit, an expected speed of target vehicles in a vicinity of a vehicle;
    broadcasting, with a communication module, a public safety message at a power level based on a range request accompanying the public safety message; and
    increasing the power level when a difference between the expected speed of the target vehicles and an actual speed of the vehicle satisfies a speed threshold.

* * * * *